United States Patent
Ogawa et al.

[11] Patent Number: 5,446,116
[45] Date of Patent: Aug. 29, 1995

[54] PROCESS FOR GAS PHASE POLYMERIZATION

[75] Inventors: Hiroyuki Ogawa, Singapore, Singapore; Hideo Kusakabe, Chiba, Japan; Ikuhiro Tamaru, Singapore, Singapore; Yoshizumi Sasaki, Chiba, Japan; Jitsuo Kurokawa, Chiba, Japan

[73] Assignee: Sumitomo Chemical Company, Limited, Japan

[21] Appl. No.: 103,694

[22] Filed: Aug. 10, 1993

Related U.S. Application Data

[60] Division of Ser. No. 968,460, Oct. 29, 1992, Pat. No. 5,380,494, which is a continuation of Ser. No. 773,500, Oct. 9, 1991, abandoned.

[30] Foreign Application Priority Data

Nov. 15, 1990 [JP] Japan .................................. 2-310424

[51] Int. Cl.[6] .............................................. C08F 2/34
[52] U.S. Cl. ........................................ 526/68; 526/901
[58] Field of Search ...................... 526/67, 68, 69, 88, 526/901

[56] References Cited

U.S. PATENT DOCUMENTS

| | | | |
|---|---|---|---|
| 3,142,542 | 7/1964 | Schwarzenbek | 422/143 |
| 3,300,457 | 1/1967 | Schmid et al. | 526/88 |
| 3,822,986 | 7/1974 | Tsekhovoi | 431/328 |
| 3,912,460 | 10/1975 | McGann | 252/417 |
| 4,003,712 | 1/1977 | Miller | 526/68 |
| 4,200,715 | 4/1980 | Lynch | 422/131 |
| 4,382,065 | 5/1983 | Shiga et al. | 422/147 |
| 4,557,904 | 12/1985 | Brod et al. | 526/88 |
| 4,703,094 | 10/1987 | Raufast | 422/131 |
| 4,843,051 | 6/1989 | Kovacs | 422/144 |
| 4,877,587 | 10/1989 | Rhee et al. | 526/68 |
| 5,187,246 | 2/1993 | Baker et al. | 526/88 |

FOREIGN PATENT DOCUMENTS

| | | |
|---|---|---|
| 2177480 | 11/1973 | France . |
| 61-44905 | 3/1986 | Japan . |
| 1398965 | 6/1975 | United Kingdom . |

*Primary Examiner*—Joseph L. Schofer
*Assistant Examiner*—Tom Weber
*Attorney, Agent, or Firm*—Cushman, Darby & Cushman

[57] ABSTRACT

A fluidized bed-type polymerization apparatus has an upper blowing equipment installed at a definite height in the fluidized bed area. Through the equipment, a part of the circulating gas and a part, or the whole, of the fresh feed material is blown, thereby to prevent the formation of lumps of polymer in the fluidized bed portion, owing to improved intermixing at the upper portion of the fluidized bed, as well as efficient heat-removal at that portion.

4 Claims, 3 Drawing Sheets

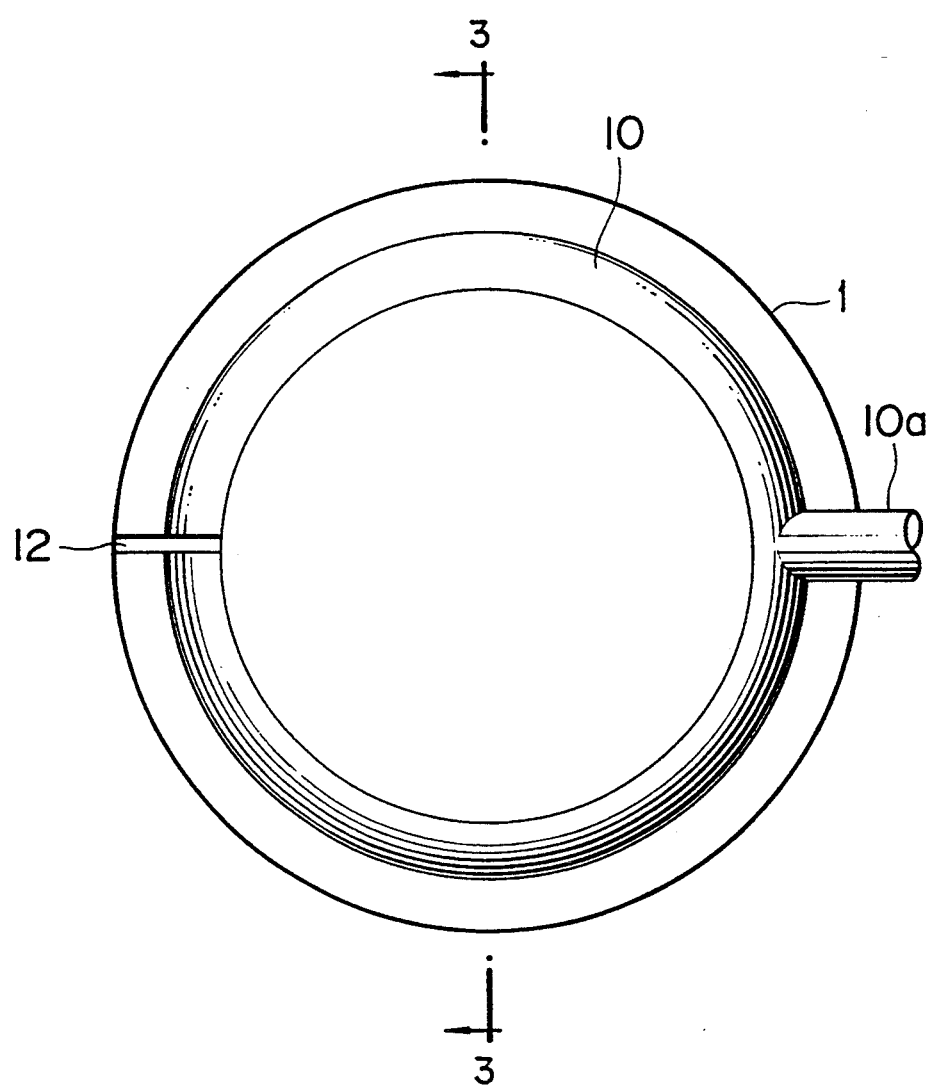

PROCESS FOR GAS PHASE POLYMERIZATION

This is a division of application No. 07/968,460, filed Oct. 29, 1992, now U.S. Pat. No. 5,380,494, which was a continuation of 07/773,500 filed Oct. 9, 1991 now abandoned.

The present invention relates to an apparatus for fluidized bed-type gas phase polymerization.

In olefin polymerization, recently, yield of polymer against catalyst constituent has been progressively improved owing to a significant improvement in performance of the polymerization catalysts. Thus, an amount of the residual transition metal catalyst constituent in the polymer product is diminished, and the catalyst-removing step is able to be omitted.

Olefin polymerization includes slurry polymerization carried out in an inert hydrocarbon solvent, bulk polymerization carried out in a liquefied monomer such as liquefied propylene, gas phase polymerization carried out in a gas phase and the like. Recently, the gas phase polymerization has come into the limelight, since, besides the progress in the catalyst performance, the solvent recovery and purification steps are unnecessary and the recovery of monomer and drying of the polymer product are easy. At the same time, various kinds of gas phase polymerization apparatus have come to be utilized.

When a highly effective catalyst is used in the conventional gas phase polymerization apparatus, however, intermixing of a reaction gas with the catalyst and the polymer product in the fluidized bed is not homogeneous. Thus concentrated layers of the highly effective catalyst often tend to be formed in the fluidized bed. Such tendency is particularly significant, when a large scale apparatus is employed, or when an increased amount of the catalyst is fed in order to increase the production capacity.

This results in such problems as difficult removal of the heat of polymerization reaction, which is liable to form lumps of polymer due to the locally accelerated polymerization reaction. Stable operation is spoiled and accompanied by inevitable cessation of operation of a reactor, and the quality of the polymer product is deteriorated.

An object of the present invention is to provide for a gas phase polymerization apparatus which is free from such problems as those caused by the conventional gas phase polymerization apparatus, namely, which steadily yields polyolefins of excellent quality by preventing the formation of lumps of polymer due to the heterogeneous intermixing in the fluidized bed.

The present invention relates to a gas phase polymerization reactor provided with a fluidized bed portion, which is characterized by having a circulating gas passage at the top of the reactor; a gas chamber provided at the bottom of the reactor and partitioned by a gas-dispersing plate to form an introducing passage for the circulating gas and an introducing passage for a fresh feed material; a discharging passage for the polymer product provided at the fluidized bed portion above the gas-discharging plate; a feeding passage for a polymerization catalyst; and an upper blowing equipment in order to blow a part of the circulating gas and/or a part or the whole of the fresh feed material, into the fluidized bed portion, said equipment being located at a height of l which satisfies the following equations of (1), (2) and (3):

$$0 < l < L \tag{1}$$

$$0.4 < l/D 1.8 \tag{2}$$

$$0.7 \leq L/D \leq 2.0 \tag{3}$$

wherein L is height of the fluidized bed; D is inner diameter of the polymerization reactor; and l is arbitrary height based on the gas-dispersing plate (the L, D and l being units of length).

The present invention also relates to a method for operating such a gas phase polymerization apparatus, which is characterized by introducing into the upper blowing equipment, 0–20% by weight of the whole circulating gas and 0–100% by weight of the fresh feed material; and the whole amount of the material introduced to the upper blowing equipment is not more than 30% by weight of the whole circulating gas.

The present inventors have found that there was an insufficiently fluidized zone at a particular area corresponding to a height of Z which satisfies the equations (1), (2) and (3) as mentioned above, and have accomplished the present invention by improving the state of fluidization at that area.

The gas phase polymerization apparatus of the present invention is mainly employed for homopolymerization and copolymerization of olefins, such as ethylene, propylene, butene, pentene, etc.

In the operation of the present apparatus, the most satisfactory state of fluidization is secured when not less than 80% by weight of the whole circulating gas is introduced into the circulating gas-introducing passage at the bottom of the polymerization reactor and not more than 20% by weight of the whole circulating gas is introduced into the upper blowing equipment. When the fresh feed material is introduced in the liquid state in the amount corresponding to the amount of the polymer produced, heat of reaction at the fluidized bed is removed more effectively.

The dividing ratio of the fresh feed material to the bottom of the reactor and to the upper blowing equipment may be 0–100% by weight, respectively, to each portion in the liquid state. In other words, the whole material may be fed at the bottom of the reactor or into the upper blowing equipment. Alternatively, the material may be fed to the respective portions in any ratio.

The gas phase polymerization apparatus of the present invention enables one to secure the stable state of fluidization of the polymerization reactor, the homogeneous intermixing even at and around the wall surface of the reactor, and thus the prevention of the formation of lumps of the polymer, by providing an upper blowing equipment in the fluidized bed portion above the plate, at a height of l which satisfies the following equations:

$$0 < l < L \tag{1}$$

$$0.4 < l/D \leq 1.8 \tag{2}$$

$$0.7 \leq L/D \leq 2.0 \tag{3}$$

wherein L is height of the fluidized bed, D is inner diameter of the reactor, and l is arbitrary height based on the gas-dispersing plate.

Particularly, the present invention makes it easy to design a large scale apparatus which is operated in stable conditions, and also enables a comparatively simple reorganization of the conventional apparatus, thereby to progressively increase the production capacity by increasing the feeding amount of catalyst.

Further, if the blowing holes in the upper blowing equipment are so arranged as to allow at least 5% by volume of the blowing gas to blow in the direction of the wall surface of the polymerization reactor, the intermixing at and around the wall surface is accelerated, thereby the polymerization reaction progresses more steadily.

Examples according to the present invention will be illustrated below with reference to the following Figures.

FIG. 2 shows an exemplified plan of the upper blowing equipment according to the present invention.

FIG. 3 shows a section at A—A' (shown in FIG. 2) of the upper blowing equipment equipped in the gas phase polymirization apparatus according to the present invention.

In these Figures, 1 is a polymerization reactor; is a fluidized bed portion; 3 is an outlet of the circulating gas; 4 is a gas chamber; 5 is an inlet of the circulating gas; 6a, 6b and 6c are introducing passages for a fresh feed material; 7 is a gas dispersing plate; 8 is a catalyst feeding passage; 9 is a passage for discharging the polymer product; 10 is an upper blowing equipment; 10a is an inlet for the upper blowing gas; 11 is a circulating compressor; 12 is a sustaining rod of the upper blowing apparatus.

EXAMPLE 1

In the Examples, a duplicate explanation of elements having the same symbol will be ommited, since they have the same function.

Figure 1:
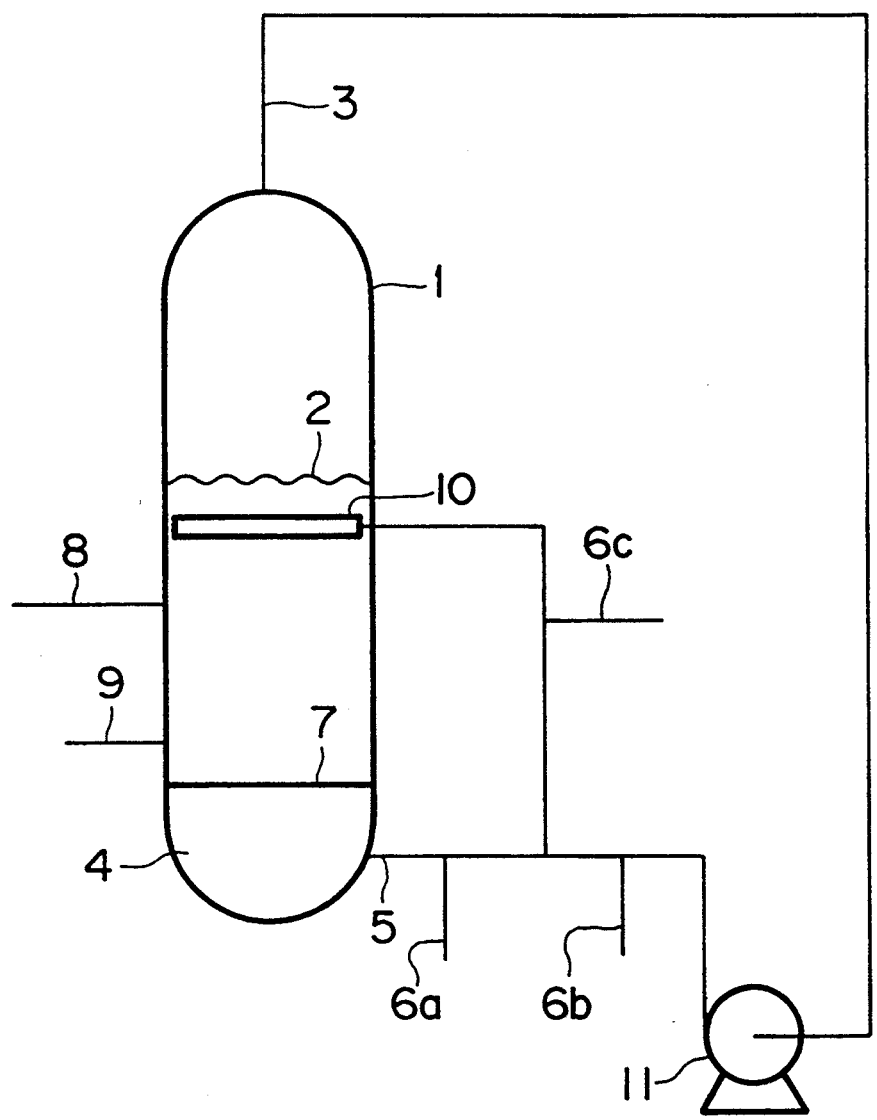
FIG. 1 shows an exemplified general constitution of a gas polymerization apparatus equipped with an upper blowing equipment according to the present invention.
Figure 3A:
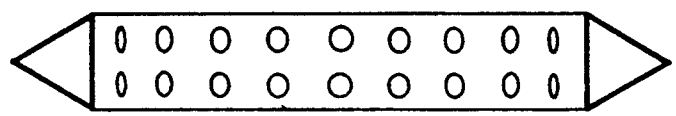
FIG. 3(a) shows an exemplified section of the upper blowing equipment in which the section is triangle.
Figure 3B:
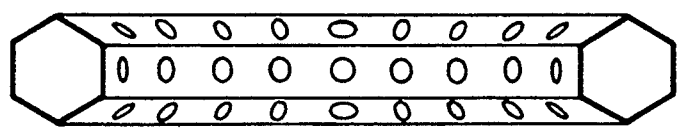
FIG. 3(b) shows an exemplified section of the upper blowing equipment in which the section is hexagonal.
Figure 3C:
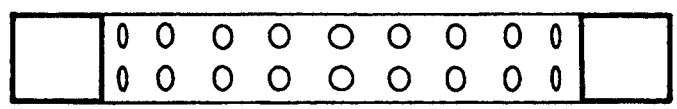
FIG. 3(c) shows an exemplified section of the upper blowing equipment in which the section is quadrangle.
Figure 3D:
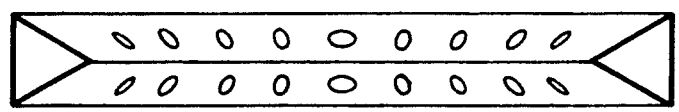
FIG. 3(d) shows another exemplified section of the upper blowing equipment in which the section is triangle.
Figure 3E:
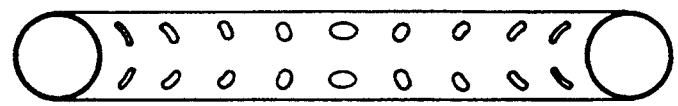
FIG. 3(e) shows an exemplified section of the upper blowing equipment in which the section is circular.

The general constitution of a gas polymerization apparatus according to the present invention is shown in FIG. 1.

The gas polymerization apparatus in FIG. 1 is constituted from a polymerization reactor 1, a gas-dispersing plate 7 installed in the polymerization reactor, a gas chamber 4 located beneath, and partitioned by, the gas-dispersing plate 7, a fluidized bed 2 composed of a polymer product containing a catalyst and located above the gas-dispersing plate 7, a feeding passage 8 for the polymerization catalyst, a passage 9 for discharging the polymer product, an inlet 5 for the circulating gas connected to the gas chamber 4, an outlet 3 for the circulating gas from the fluidized bed, introducing passages 6a, 6b and 6c for a fresh feed material (the sites a, b and c being settled arbitrarily), an upper blowing equipment 10, and a circulating compressor 11.

The introducing passages 6a, 6b and 6c for the fresh feed material may be installed at any sites, for example, just before the inlet to the gas chamber 4, just behind the circulating compressor 11, or just before the upper blowing equipment. The circulating gas is mainly introduced from the passage for circulating gas connected to the gas chamber 4.

The upper blowing equipment 10 is at a height of l based on the gas-dispersing plate 7, which satisfies the equations (1), (2) and (3) as mentioned above. If it is located at a height which does not satisfy the terms of the equations (1), (2) and (3), the results are unsatisfactory due to the heterogeneous intermixing state at the surface area of the fluidized bed portion and thus accelerated formation of lumps of polymer.

The upper blowing equipment 10 is preferably installed along the wall surface in such a way that the holes of the same equipment 10 blowing against the wall surface of the polymerization reactor are located at a distance-less than ¼ D from the wall surface. The form of the section of the tube in the upper blowing equipment may be circular or polygonal, and the triangle or hexagonal form as set forth in FIG. 3 is preferable. The size of the tube may be selected arbitrarily depending on the amount of gas.

By arranging the gas blowing holes in the upper blowing equipment 10 so that at least 5% by volume of the whole gas amount blown from the same equipment 10 is directed upwardly (based on the equipment) and against the wall surface, the intermixing at and around the wall surface is accelerated with satisfactory results. The balance of the gas may be directed downwardly or to the inner port ion.

As for the amount of the blowing gas from the upper blowing equipment 10, at most 20% by weight of the whole circulating gas amount may be blown from the equipment 10. As for the fresh feed material, an amount of an arbitrary ratio of the whole feeding amount may be blown from the equipment 10, and the balance may be introduced along with the circulating gas blown into the gas chamber 3 located at the lower portion of the polymerization reactor.

Any shape of the blowing holes installed in the upper blowing equipment may be employed with a similar effects, such as pipe grid (with inclined nozzles), pipe grid (with downward nozzles), slit, bubble cap, perforated plate, perforated nozzle, and the like.

By providing an agitator in the fluidized bed portion of the present gas phase polymerization apparatus, further advantageous effects can be attained. In this case, the agitator may be so arranged that the agitating blades do not contact to the upper blowing equipment with a suitable length of the agitating blade to effect the agitation around the equipment.

EXAMPLES 2–5 AND COMPARATIVE EXAMPLES 1–2

Using a polymerization reactor of 1 m³ volume, arranged according to the present invention, propylene polymerization was carried out with the following operating conditions: whole circulating gas of 120 m³/hr, a pressure of 18 kg/cm²G, concentration of propylene of 92% by volume, $H_2$ 0.2% by volume, the balance of inert gas, a solid catalyst of 1 g/hr, propylene feed of 25 kg/hr, and an average temperature of 80° C.

Ratios of the circulation gas and propylene divided to the upper blowing equipment are shown in Table 1, with the balances being introduced to the bottom of the polymerization reactor.

TABLE 1

| No. of Examples and Comparative examples | Ratios of circulating gas introduced | | Ratios of propylene introduced | | Ratio of gas introduced to the upper blowing equipment to the whole circulating gas wt % | Remarks |
|---|---|---|---|---|---|---|
| | bottom wt % | upper wt % | bottom wt % | upper wt % | | |
| Ex-2 | 80 | 20 | 75 | 25 | 20.1 | Steadily operable, acompanied by no lumps of polymer |
| Ex-3 | 95 | 5 | 25 | 75 | 5.1 | |
| Ex-4 | 90 | 10 | 50 | 50 | 10.3 | |
| Ex-5 | 90 | 10 | 100 | 0 | 10.0 | Continuously operable, accompanied by formation of little lumps of polymer |
| Comp-1 | 100 | 0 | 100 | 0 | 0 | Inoperable, |
| Comp-2 | 30 | 70 | 0 | 100 | 70.6 | accompanied by formation of lumps of polymer |

As mentioned above, the gas phase polymerization apparatus and the method for operating the same, according to the present invention, prevents the formation of lumps of polymer in the fluidized bed portion, owing to the improved intermixing at the upper portion of the fluidized bed, as well as efficient heat-removal at that portion. Thus, a polymer of excellent quality is obtained steadily with a steady operation.

We claim:

1. A gas phase polymerization process comprising the steps of:
   providing a vertically oriented cylindrical polymerization reactor, said reactor having a gas dispersing plate, a gas chamber at the bottom of said reactor, below said gas dispersing plate, and a fluidized bed section therein, wherein said gas dispersing plate partitions said gas chamber and said fluidized bed section is located above said gas dispersing plate;
   removing circulating gas from the top of said polymerization reactor;
   introducing a portion of said circulating gas or l portion of said circulating gas and fresh feed material through a gas inlet to said gas chamber;
   feeding a polymerization catalyst into said polymerization reactor through a catalyst inlet defined above said gas dispersing plate;
   introducing another portion of said circulating gas or another portion of said circulating gas and fresh feed material through an upper blowing means into said fluidized bed section of said polymerization reactor at a location distinct from and vertically spaced from polymerization catalyst inlet, wherein at least 5% by volume of the circulating gas introduced at height l is blown generally towards an interior wall of said polymerization reactor, whereby said another portion of said circulating gas is introduced within said polymerization reactor at a height of l which satisfies equations (1), (2) and (3):

$$0 < l < L \qquad (1)$$

$$0.4 \leq l/D \leq 1.8 \qquad (2)$$

$$0.7 \leq L/D \leq 2.0 \qquad (3)$$

wherein L is the height from said gas dispersing plate to the top of said fluidized bed section; D is the inner diameter of said cylindrical polymerization reactor; and l is an arbitrary height from said gas dispersing plate to a location of introduction of said another portion of said circulating gas; and
   removing a polymer product from the polymerization reactor.

2. A gas phase polymerization process comprising the steps of:
   providing a vertically oriented cylindrical polymerization reactor, said reactor having a gas dispersing plate, a gas chamber at the bottom of said reactor, below said gas dispersing plate, and a fluidized bed section therein, wherein said gas dispersing plate partitions said gas chamber and said fluidized bed section is located above said gas dispersing plate;
   removing circulating gas from the top of said polymerization reactor;
   introducing a portion of said circulating gas or a portion of said circulating gas and fresh feed material through a gas inlet to said gas chamber;
   feeding a polymerization catalyst into the polymerization reactor through a catalyst inlet disposed above said gas dispersing plate;
   introducing another portion of said circulating gas or another portion of said circulating gas and fresh feed material into said fluidized bed portion of said polymerization reactor at a location distinct from and vertically spaced from polymerization catalyst inlet, wherein at least 5% by volume of said another portion of said circulating gas introduced at height l is blown generally towards an interior wall of said polymerization reactor, whereby said another portion of said circulating gas is introduced within said polymerization reactor at a height of l which satisfies equations (1), (2) and (3):

$$0 < l < L \qquad (1)$$

$$0.4 \leq l/D \leq 1.8 \qquad (2)$$

$$0.7 \leq L/D \leq 2.0 \qquad (3)$$

wherein L is the height from said gas dispersing plate to the top of said fluidized bed section; D is the inner diameter of said cylindrical polymerization reactor; and E is an arbitrary height from the gas dispersing plate to a location of introduction of said another portion of said circulating gas;

removing a polymer product from the polymerization reactor;

wherein up to 20% by weight of said circulating gas and up to 100% by weight of the fresh feed material are introduced at the height l such that the amount of material introduced at the height l is not more than 30% by weight of the whole circulating gas introduced into said polymerization reactor.

3. A gas phase polymerization process according to claim 1, further comprising providing an agitator in the fludized bed portion.

4. A gas phase polymerization process process according to claim 3, wherein said agitator has agitating blades of a length so as to effect agitation around said upper blowing means without contacting said upper blowing means.

* * * * *